(12) United States Patent
Cahen et al.

(10) Patent No.: US 11,284,738 B2
(45) Date of Patent: Mar. 29, 2022

(54) EASY CONNECTION OF A LIQUID TANK TO A BEVERAGE MACHINE

(71) Applicant: NESTEC S.A., Vevey (CH)

(72) Inventors: Antoine Cahen, Lausanne (CH); Eric Granger, Lausanne (CH)

(73) Assignee: Societe des Produits Nestle S.A., Vevey (CH)

( * ) Notice: Subject to any disclaimer, the term of this patent is extended or adjusted under 35 U.S.C. 154(b) by 214 days.

(21) Appl. No.: 15/774,421

(22) PCT Filed: Nov. 9, 2016

(86) PCT No.: PCT/EP2016/077076
§ 371 (c)(1),
(2) Date: May 8, 2018

(87) PCT Pub. No.: WO2017/081055
PCT Pub. Date: May 18, 2017

(65) Prior Publication Data
US 2018/0317697 A1    Nov. 8, 2018

(30) Foreign Application Priority Data
Nov. 11, 2015  (EP) .................................... 15194020

(51) Int. Cl.
*A47J 31/36*    (2006.01)
*A47J 31/44*    (2006.01)

(52) U.S. Cl.
CPC ........... *A47J 31/4403* (2013.01); *A47J 31/36* (2013.01)

(58) Field of Classification Search
CPC ...... A47J 31/0642; A47J 31/0668–0678; A47J 31/407; A47J 37/10; A47J 31/36; A47J 31/3666–3671; A47J 31/3676
See application file for complete search history.

(56) References Cited

U.S. PATENT DOCUMENTS

| 2005/0247204 A1* | 11/2005 | Lafond | ................... A47J 31/36 99/279 |
| 2012/0285966 A1* | 11/2012 | Mori | ................... A47J 31/4403 220/315 |
| 2013/0014647 A1 | 1/2013 | Mori et al. | |

FOREIGN PATENT DOCUMENTS

| FR | 2841116 | 12/2003 |
| JP | 5679223 | 6/1981 |
| JP | 5799640 | 6/1982 |
| JP | 2004236761 A | 8/2004 |
| WO | 2011089210 | 7/2011 |

* cited by examiner

*Primary Examiner* — Christopher J Besler
(74) *Attorney, Agent, or Firm* — K&L Gates LLP

(57) ABSTRACT

A beverage machine (1) has: a beverage processing module (10) with a liquid inlet (11) and a module fastening arrangement (12,13,15); and a liquid supply tank (30) with a liquid outlet (31) and a tank fastening arrangement (32,33,35). The outlet (31) is fluidically connectable to the inlet (11) and disconnectable therefrom. The fastening arrangements (12,13,15;32,33,35) comprises a female connector (12) and a male connector (32) cooperating with the female connector (12) for reversibly assembling the module (10) and the tank (30). The fastening arrangements (12,13,15;32,33,35) further comprise at least one pair of a support surface (13,35) and a resilient member (33,15) cooperating together for urging the male connector (32) into the female connector (12) so as to fasten the tank (30) to the module.

19 Claims, 2 Drawing Sheets

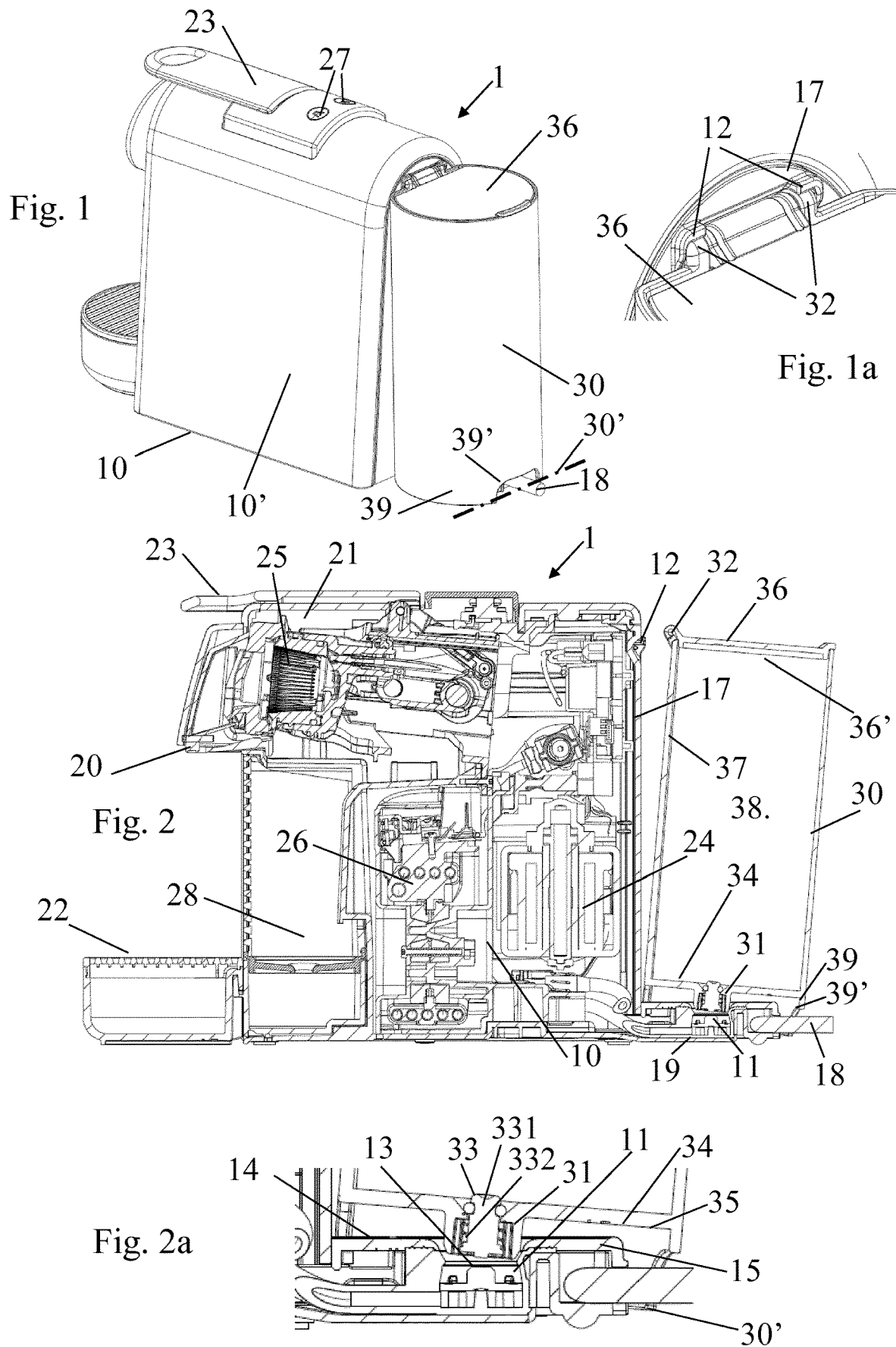

EASY CONNECTION OF A LIQUID TANK TO A BEVERAGE MACHINE

CROSS REFERENCE TO RELATED APPLICATIONS

The present application is a National Stage of International Application No. PCT/EP2016/077076, filed on Nov. 9, 2016, which claims priority to European Patent Application No. 15194020.2, filed on Nov. 11, 2015, the entire contents of which are being incorporated herein by reference.

FIELD OF THE INVENTION

The present invention concerns a beverage machine having a beverage preparation module and a liquid storage tank that is disconnectably connectable thereto.

For the purpose of the present description, a "beverage" is meant to include any human-consumable liquid substance, such as tea, coffee, hot or cold chocolate, milk, soup, baby food, etc. . . . . A "capsule" is meant to include any pre-portioned beverage ingredient, such as a flavouring ingredient, within an enclosing packaging of any material, in particular an airtight packaging, e.g. plastic, aluminium, recyclable and/or biodegradable packagings, and of any shape and structure, including soft pods or rigid cartridges containing the ingredient. The capsule may contain an amount of ingredient for preparing a single beverage portion or a plurality of beverage portions.

BACKGROUND ART

Certain beverage machines use capsules containing ingredients to be extracted or to be dissolved and/or ingredients that are stored and dosed automatically in the machine or else are added at the time of preparation of the drink. Other beverage machines use loose ingredients to prepare beverages. Some beverage machines possess filling means that include a pump for liquid, usually water, which pumps the liquid from a source of water that is cold or indeed heated through heating means, e.g. a thermoblock or the like.

Especially in the field of coffee preparation, machines have been widely developed in which a capsule containing beverage ingredients is inserted in a brewing device. The brewing device is tightly closed about the capsule, water is injected at the first face of the capsule, the beverage is produced in the closed volume of the capsule and a brewed beverage can be drained from a second face of the capsule and collected into a receptacle such as a cup or glass. Brewing devices have been developed to facilitate insertion of a "fresh" capsule and removal of the capsule upon use. Typically, the brewing devices comprise two parts relatively movable from a configuration for inserting/removing a capsule to a configuration for brewing the ingredient in the capsule.

A beverage machine typically includes a housing containing a beverage processing module and a water tank in fluid communication with the beverage processing module. Examples of such beverage machines are disclosed in EP 1 208 782, EP 1 267 687, EP 1 686 879, EP 1 731 065, EP 1 829 469, EP 1 864 598, EP 1 865 815, EP 1 867 260, EP 1 878 368, EP 2 222 210, EP 2 222 211, EP 2 222 212, EP 2 227 121, EP 2 227 122, US 2008/0006159, U.S. Pat. No. 7,165,488, WO 2007/111884, WO 2009/074553, WO 2010/015427 and WO 2012/055767.

Usually the water tank is removable to be refilled by a user when empty. Some systems include a continuous water supply by connecting the beverage machine to the city water distribution network, as for instance disclosed in CN201076369, PCT/EP15/065409, PCT/EP15/065410, PCT/EP15/065411 and PCT/EP15/065414.

WO 2011/089210 discloses an embodiment of a beverage machine with a beverage preparation module and a removable water tank that is connectable to the module and that has a lid. The lid is movable between an open and a closed position. The lid has fastening means for fastening the water tank to the module.

SUMMARY OF THE INVENTION

The invention relates to a machine for preparing a beverage. The machine can be an in-home or out of home machine. The machine may be for the preparation of coffee, tea, chocolate, cacao, milk, soup, baby food, etc . . . .

The preparation of a beverage typically includes the mixing of a plurality of beverage ingredients, e.g. water and milk powder, and/or the infusion of a beverage ingredient, such as an infusion of ground coffee or tea with water. One or more of such ingredients may be supplied in loose and/or agglomerate powder form and/or in liquid form, in particular in a concentrate form. A carrier or diluents liquid, e.g. water, may be mixed with such ingredient to form the beverage. Typically, a predetermined amount of beverage is formed and dispensed on user-request, which corresponds to a serving. The volume of such a serving may be in the range of 25 to 200 ml and even up to 300 or 400 ml, e.g. the volume for filling a cup, depending on the type of beverage. Formed and dispensed beverages may be selected from ristrettos, espressos, lungos, cappuccinos, latte macchiato, caf latte, americano coffees, teas, etc. . . . for instance, a coffee machine may be configured for dispensing espressos, e.g. an adjustable volume of 20 to 60 ml per serving, and/or for dispensing lungos, e.g. a volume in the range of 70 to 150 ml per serving.

The machine may be arranged for preparing within a mixing chamber a beverage by passing hot or cold water or another liquid through a cartridge containing an ingredient, such as a flavouring ingredient, of the beverage to be prepared, such as ground coffee or tea or chocolate or cacao or milk powder.

The beverage machine of the invention comprises: a beverage processing module having a liquid inlet and a module fastening arrangement; and a liquid supply tank having a liquid outlet and a tank fastening arrangement, e.g. a tank for supplying water.

The outlet is fluidically connectable to the inlet and disconnectable therefrom. Hence, liquid can be passed from the tank to the module via the outlet and the inlet.

Typically, when the tank is removed from the machine and separated from the machine's module, the tank's outlet is disconnected from the module's inlet.

For instance the liquid supply tank has an opening delimited by a rim of the tank for (re-)filling the tank. The tank can be delimited by a bottom part and a peripheral wall extending from and above the bottom part towards the opening. The outlet can be located at the bottom of the tank.

Examples of beverage machines with liquid supply tanks that can be adapted for the purpose of the present invention are disclosed in EP 2 228 633, WO 2009/074550, WO 2010/046442, WO 2010/128109, WO 2011/083103, WO 2011/089210, WO 2011/144723, WO 2012/055767 and WO 2013/104643.

The fastening arrangements may have a female connector and a male connector cooperating with the female connector for reversibly assembling the module and the tank.

For example, a male tank connector cooperates with a female module connector or a male module connector cooperates with a female tank connector.

The tank can have a pivot area about which the tank is pivoted into and out of a fastening position in which the tank and the module are fastened together via the fastening arrangement.

In accordance with the invention, the fastening arrangements further comprise at least one pair of a support surface and a resilient member cooperating together, such as module support surface and a tank resilient member or a tank support surface and a module resilient member, for urging the male connector into the female connector so as to fasten the tank to the module.

Advantageously, the female and male connectors have one or more degrees of freedom when the tank is assembled to the module, the degree(s) of freedom being generally in opposition to a direction into which the tank is urged by the resilient member cooperating with the support surface. Such urging direction is deemed to be generally in opposition when its orthogonal projection onto the direction(s) of the degree(s) of freedom is opposite thereto.

The said at least one pair may include a support surface and a resilient member configured to be urged together when the tank is assembled to the module. Hence, in such a situation, the tank and the module can be urged: together at the level of the cooperating support surface and resilient member; and urged together at the level of the female and male connectors.

The support surface can form an outer face of the tank and the resilient member may form a support arm or panel, such as a foot, projecting from a main body of the module and extending across the tank at the outer face, e.g. across a predominant part of the tank at the outer face. The support surface can form an outer face of the module and the resilient member may form a support arm or panel, such as a foot, projecting from a main body of the tank and extending across the module at the outer face, e.g. across a predominant part of the module at the outer face.

The said at least one pair can include a support surface and a resilient member configured to urge apart (at the support surface and the resilient member): an outer face of the tank and an outer face of the module that faces the outer tank face. Hence, in such a situation, the tank and the module can be urged: apart at the level of the cooperating support surface and resilient member; and urged together at the level of the female and male connectors.

It is to be noted that both above configurations at the level of the cooperating support surface and resilient member can be combined in a single embodiment, namely: the tank and module urging apart arrangement and the tank and module urging together arrangement. Both arrangements result in combined forces urging together the tank and module at the level of the female and male connectors.

The resilient member may include an urging element, such as a ram mounted on a spring, movably mounted at one of the outer faces, the support surface being fixedly or integrally or movably mounted at the other of the outer faces (so as to resist against the resilient member).

The resilient member can be movably mounted to or in the outlet and the support surface can be fixedly or integrally or movably mounted in or to said inlet. The resilient member can be movably mounted to or in the inlet and the support surface may fixedly or integrally or movably mounted in or to the outlet.

The resilient member and the support surface can be formed as or within a male-female mechanical connection arrangement between the module and the tank, e.g. a mechanical connection formed by the inlet and outlet.

The outer faces of the tank and module can thus be urged together or apart or both (if different systems are combined) to cause the tank and the module to be urged together at the level of the female and male connectors.

The female connector can be formed as a recessed part and the male connector may be formed as a protruding part having a shape generally complementary to the recessed part.

The female connector and the male connector may be formed as a hook part and a catch part (that catches the hook).

The machine typically has a lid at an opening of the tank and movable between a position covering the opening and a position uncovering the opening. For instance, the lid is permanently assembled to the tank or to the module or is removable from both the tank and the module. A permanent assembly is an assembly which requires for separation a destruction or special tools or special knowledge that is not readily available to the mere user of the machine.

The lid and the tank can have a fastening arrangement for fastening the lid in the covering position, such as a lid flange projecting and fastened in or around a tank rim delimiting the opening and/or a lid and a tank in a hook and hook-retainer configuration when the lid is in the covering position. The lid can be permanently or temporarily assembled to the tank, the lid comprising one of the female connector and the male connector for cooperating with the other of the female connector and the male connector comprised by the module so as to fasten tank with the lid to the module.

The male connector may be formed by a hinge of the lid and/or by a hinge holder of the tank, e.g. end portions of the hinge or hinge holder.

The female and male connectors can be assembled by moving the lid, e.g. pivoting the lid, from the open to the closed position and being disassembled by moving the lid, e.g. pivoting the lid, from the closed to the open position.

The tank may include an upright wall delimiting a liquid storage cavity, an outside face of the upright wall forming or being fixed to one of the female connector and the male connector for cooperating with the other of the female connector and the male connector. For instance, the other of the female connector and the male connector is formed or fixed to an outside face of an upright wall of the module.

The female connector and the male connector can be located at one end of the tank, said at least one pair (the cooperating support surface and resilient member) being locate at a generally opposite end of the tank when the tank is assembled to the module.

The female connector and the male connector can be located at one face of the tank, said at least one pair being locate at another face of the tank when the tank is assembled to the module. For instance, said another face is adjacent to or opposite to said one face, e.g. said another face can be a bottom face of the tank and said one face can be a side face or a top face of the tank.

The module may include a beverage outlet to which the liquid inlet is fluidically connected.

Any beverage outlet is contemplated. Examples of advantageous outlets are disclosed in WO 2006/050769, WO 2011/095502, WO 2012/055765, WO 2012/072758 and WO 2013/127907.

The module may include a platform for supporting the tank and or extending under a bottom of the tank when the tank is assembled to the module, the platform optionally comprising the inlet.

The module can have an ingredient inlet for supplying an ingredient, such as an ingredient contained in a capsule, to be processed with liquid from the tank via the liquid inlet.

The ingredient inlet usually has an ingredient passage with or without a loading device for transporting the ingredient at the inlet. Examples of such arrangements are disclosed in EP 1447034, WO 01/84993, WO 02/078499, WO 03/056987, WO 2012/072766, WO 2012/093107, WO 2012/126971, WO 2014/056821, WO 2014/056641 and WO 2014/056642.

The module can comprise a support for placing a user-recipient, e.g. a cup or a mug, for collecting the beverage delivered by the beverage outlet. Suitable examples of such supports are disclosed in EP 1943931, EP 1867260, EP 2189087, EP 2189088, EP 2189089, WO 2009/074557, WO 2011/154492, WO 2012/007313 and WO 2013/104636.

The module may include an actuator, such as a handle or a motor, for actuating the module for receiving in and/or evacuating from the module an ingredient, such as an ingredient contained in a capsule.

The module may have a pump for pumping liquid from the outlet (connected to the inlet) to the beverage outlet.

Examples of suitable pumps and/or their integration in the fluid line of beverage machines are disclosed in WO 2009/024500, WO 2009/150030, WO 2010/006953, WO 2011/107574, WO 2010/108700 and WO 2013/098173.

The module may comprise a mixing chamber in fluid connection with the inlet and the beverage outlet for mixing the liquid with an ingredient such as an ingredient contained in a capsule. For instance, the mixing chamber is actuated, e.g. by a handle, between an open position for inserting into and/or removing from the chamber the ingredient and a closed position for mixing the ingredient and liquid for subsequent dispensing via the beverage outlet.

Suitable examples of such actuators and mixing chambers are disclosed in U.S. Pat. No. 8,272,319, WO 2004/071259, WO 2005/004683, WO2007/135136, WO 2009/043630, WO 2010/015427, WO 2012/025258, WO 2012/025259, WO 2013/127476, WO 2014/056810, WO 2014/056862, WO 2014/060370, WO 2014/096122, WO 2014/096123 and EP2015175091.6.

The module may include a thermal conditioner, such as a heater and/or a cooler, for thermally conditioning liquid supplied from the inlet to the beverage outlet.

Examples of thermal conditioners and and/or their integration in the fluid line of beverage machines are disclosed in U.S. Pat. No. 8,646,377, WO 01/54551, WO 2004/006742, WO 2006/029763, WO 2009/092746, WO 2009/043851, WO 2009/043865 and WO 2011/157675.

The module can have a machine control unit such as a control unit with a user-interface.

Implementation examples of control units and user-interfaces in beverage machines are for example disclosed in WO 2008/138710, WO 2009/043865, WO 2009/135821, WO 2010/003932, WO 2010/037806, WO 2010/046442, WO 2011/020779, WO 2011/026853, WO 2011/029813, WO 2011/144719, WO 2011/144720, WO 2012/007260, WO 2012/032019 and WO 2012/072764.

The machine can comprise an electric connector for supplying power via a power connector to the connecting device, e.g. as disclosed in WO 2009/074555.

The module can comprise a waste collector, such as a collector of residual liquid and/or residual ingredient e.g. contained in a capsule. For instance, the waste collector is removable from the module for servicing. examples of a suitable collectors are disclosed in EP 1 731 065, EP 1 867 260 WO 2009/074559.

The tank can include a valve for allowing a passage of liquid via the tank's outlet when the tank's outlet is connected to the module's inlet and for preventing the passage of liquid via the tank's outlet when the tank's outlet is disconnected from the module's inlet, for instance the valve forming part of said at least one pair (the cooperating support surface and resilient member) such as forming said urging element and optional spring as mentioned above. Typically, the valve is controlled by the assembly and disassembly of the tank to the module.

The tank may have a bottom and one or more peripheral upright sidewalls delimiting a liquid storage cavity.

The tank can include an opening delimited by a rim for filling a storage cavity of the tank with liquid, such as water.

The tank may comprise a foot on which the tank can rest when filled with liquid before and/or upon assembly of the tank to the module.

The tank can have a passage, such as a notch or through-opening, for passing an electric cord to the module, such as an opening in a foot of the tank.

BRIEF DESCRIPTION OF THE DRAWINGS

The invention will now be described with reference to the schematic drawings, wherein:

FIG. 1 is a perspective view a beverage machine having a beverage processing module and a liquid supply tank exhibiting part of the fastening arrangements according to the invention;

FIG. 1a is an enlarged view of a detail of FIG. 1 showing male and female connectors of the fastening arrangements of FIG. 1.

FIGS. 2 to 4 illustrate a sequence of fastening the tank to the module in the machine of FIG. 1; and FIGS. 2a to 4a illustrate an enlarged view of a detail of FIGS. 2 to 4 showing the pair formed of the support surface and the resilient member of part of the fastening arrangements.

DETAILED DESCRIPTION

Figure 3:
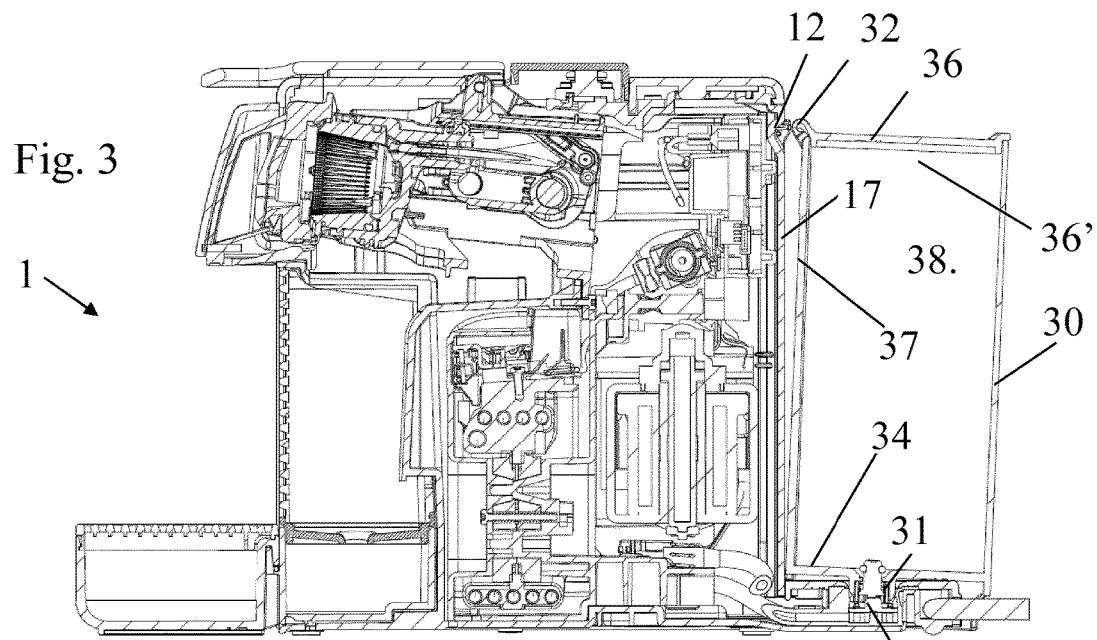
Figure 4:
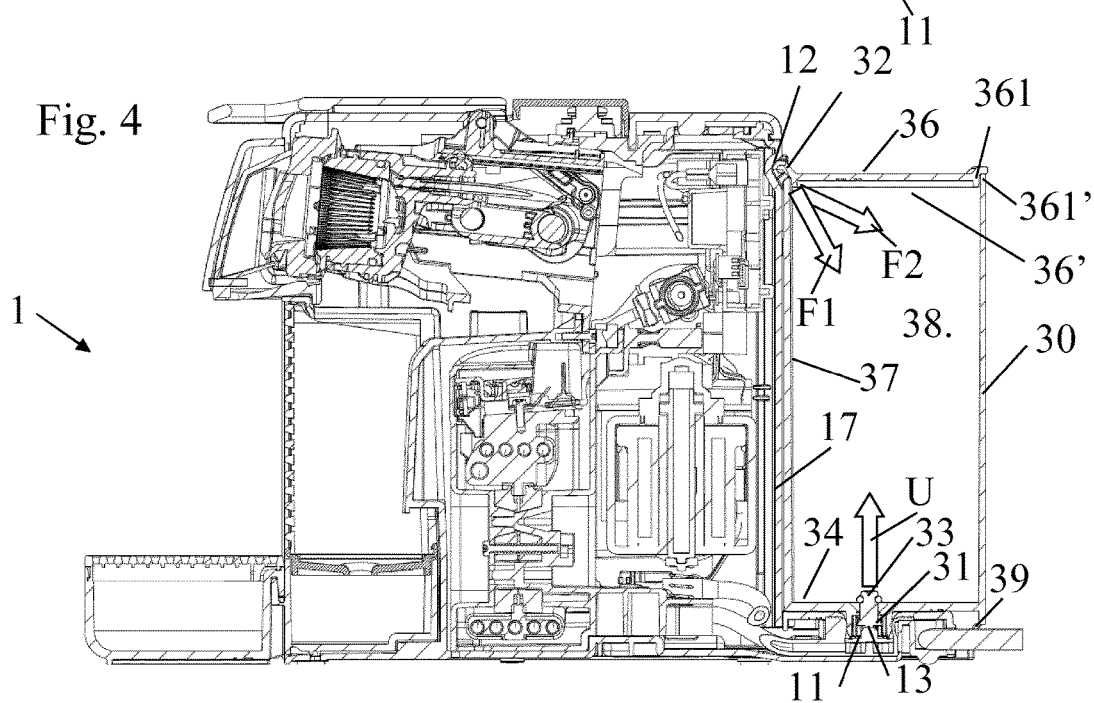

FIGS. 1 to 4a illustrates an exemplary embodiment of a beverage machine 1 according to the invention.

Machine 1 includes: a beverage processing module 10 having a liquid inlet 11 and a module fastening arrangement 12,13,15; and a liquid supply tank 30 having a liquid outlet 31 and a tank fastening arrangement 32,33,35, e.g. a tank 30 for supplying water.

Tank outlet 31 can be fluidically connected to module inlet 11 and disconnected therefrom, as illustrated in FIGS. 2a to 4a.

Figure 3A:
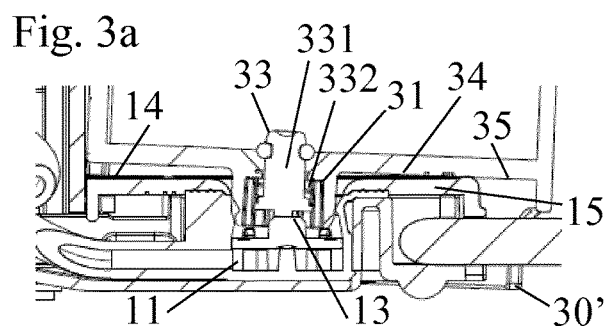
Figure 4A:
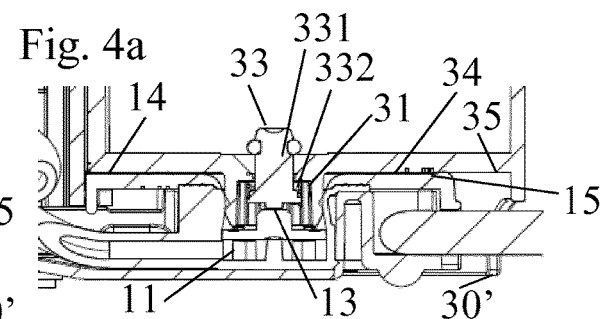

Fastening arrangements 12,13,15;32,33,35 comprise a female connector 12 and a male connector 32 cooperating with female connector 12 for reversibly assembling module and tank 30. For instance, a male tank connector 32 cooperates with a female module connector 12 or a male module connector cooperates with a female tank connector. See FIGS. 1a, 2, 3 and 4. Tank 30 can have a pivot area 30' about which tank 30 is pivoted into and out of a fastening position in which tank 30 and module 10 are fastened together via the fastening arrangement 12,13,15;32,33,35. See FIGS. 2a, 3a and 4a.

Fastening arrangements 12,13,15;32,33,35 further comprise at least one pair made of a support surface 13,35 and a resilient member 33,15 that cooperate together for urging male connector 32 into female connector 12 so as to fasten the tank 30 to the module. For instance, the pair comprises as module support surface 13 and a tank resilient member 33 or a tank support surface 35 and a module resilient member 15.

Female and male connectors 12,32 of the pair can have one or more degrees of freedom F1,F2 when tank 30 is assembled to module 10, such degree(s) of freedom F1,F2 being in general opposition to a direction U into which tank 30 is urged by resilient member 33,15 cooperating with support surface 13,35. See FIG. 4.

At least one of such pair can be made of a support surface 13,35 and a resilient member 33,15 configured to be urged together when tank 30 is assembled to module 10.

Support surface 35 may form an outer face of tank 30 and resilient member 15 may form a support arm or panel, such as a foot, projecting from a main body 10' of module 10 and extending across tank 30 at outer face 35. For instance, such support arm or panel can extend across a predominant part of the tank 30 at outer face 35. See FIGS. 2a, 3a and 4a.

The support surface can form an outer face of the module and the resilient member can form a support arm or panel, such as a foot, projecting from a main body of the tank and extending across the module at the outer face. For instance, such support arm or panel may extend across a predominant part of the module at the outer face.

At least one of such pair can be made of a support surface 13 and a resilient member 33 configured to urge apart at support surface 13 and resilient member 33: an outer face 34 of tank 30 and an outer face 14 of module 10 that faces outer tank face 34.

Resilient member 33 may include an urging element 331, such as a ram 331 mounted on a spring 332, movably mounted at one 34 of outer faces 14,34. Support surface 13 can be fixedly or integrally or movably mounted at the other 14 of outer faces 14,34. See FIGS. 2a, 3a and 4a.

Resilient member 33 can be movably mounted to or in outlet 31 and support surface 13 can be fixedly or integrally or movably mounted in or to inlet 11. See FIGS. 2a, 3a and 4a.

Resilient member may be movably mounted to or in the inlet and support surface may be fixedly or integrally or movably mounted in or to the outlet.

Resilient member 33 and support surface 13 can be formed as or within a male-female mechanical connection arrangement between module 10 and tank 30, e.g. a mechanical connection formed by inlet 11 and outlet 31. See FIGS. 2a, 3a and 4a.

Female connector 12 can be formed as a recessed part and male connector 32 can be formed as a protruding part having a shape generally complementary to the recessed part.

Female connector 12 and male connector 32 can be formed as a hook part and a catch part. See FIGS. 1a, 2 and 4.

Machine 1 can include a lid 36 at an opening 36' of tank 30. See FIGS. 1, 1a and 2. Lid 36 may be moved between a position covering opening 36' and a position uncovering opening 36'. For instance, lid 36 and tank 30 have a fastening arrangement for fastening lid 36 in the covering position. For example, such lid-tank fastening arrangement includes lid flange 361' projecting and fastened in or around a tank rim 361' delimiting opening 36' and/or a lid and a tank in a hook and hook-retainer configuration, when lid 36 is in the covering position.

Lid 36 can be permanently or temporarily assembled to tank 30. Lid 36 may include one 32 of female connector 12 and male connector 32 for cooperating with the other 32 of female connector 12 and male connector 32 comprised by module 10 so as to fasten tank 30 with lid 36 to module 10.

Male connector 32 can be formed by a hinge of lid 36 and/or by a hinge holder of tank 30, e.g. end portions of the hinge or hinge holder. See FIGS. 1, 1a and 4.

Female and male connectors can be assembled by moving the lid, e.g. pivoting the lid, from the open to the closed position and being disassembled by moving the lid, e.g. pivoting the lid, from the closed to the open position.

Tank 30 can include an upright wall 37 delimiting a liquid storage cavity, an outside face of upright wall 37 forming or being fixed to one 32 of female connector 12 and male connector 32 for cooperating with the other 12 of female connector 12 and male connector 32. For instance, the other 12 of female connector 12 and male connector 32 is formed or fixed to an outside face of an upright wall 17 of module 10.

Female and male connectors 12,32 can be located at one end of tank 30 and said at least one pair 13,35;33,15 can be locate at a generally opposite end of tank 30 when tank 30 is assembled to module 10. See FIG. 4.

Female connector 12 and male connector 32 may be located at one face 36,37 of tank 30 and said at least one pair 13,35;33,15 can be locate at an another face 34 of tank 30 when tank 30 is assembled to module 10. Such another face 34 being for instance adjacent to or opposite to said one face 36,3). For example, such another face 34 being a bottom face of tank 30 and such one face 36,37 being a side face 37 or a top face 36 of tank 30.

Module 10 may include a beverage outlet 20 to which liquid inlet 11 is fluidically connected.

Module 10 can have a platform 19 for supporting tank 30 and or extending under a bottom 35 of tank 30 when tank 30 is assembled to module 10. For example, platform 19 comprises the inlet.

Module 10 may have an ingredient inlet 21 for supplying an ingredient, such as an ingredient contained in a capsule, to be processed with liquid from tank 30 via liquid inlet 11.

Module 10 can include a support 22 for placing a user-recipient, e.g. a cup or a mug, for collecting the beverage delivered by outlet 20.

Module 10 may have an actuator, such as a handle 23 or a motor, for actuating module 10 for receiving in and/or evacuating from module 10 an ingredient, such as an ingredient contained in a capsule.

Module 10 can comprise a pump 24 for pumping liquid from outlet 31 to beverage outlet 20.

Module 10 can include a mixing chamber 25 in fluid connection with inlet 11 and beverage outlet 20 for mixing liquid with an ingredient such as an ingredient contained in a capsule. For instance, mixing chamber 25 is actuated e.g. by a handle 23 between an open position for inserting into and/or removing from chamber 25 the ingredient and a closed position for mixing the ingredient and liquid and for subsequent dispensing via beverage outlet 20.

Module 10 can have a thermal conditioner 26, such as a heater and/or a cooler, for thermally conditioning liquid supplied from inlet 11 to beverage outlet 20.

Module 10 can comprise a machine control unit such as a control unit with a user-interface 27.

Module 10 can include a waste collector 28, such as a collector of residual liquid and/or residual ingredient e.g. contained in a capsule. For instance, waste collector 28 is removable from module 10 for servicing.

Tank 30 may have a valve 331,332 for allowing a passage of liquid via the tank's outlet 31 when the tank's outlet 31 is connected to the module's inlet 11 and for preventing the passage of liquid via the tank's outlet 31 when the tank's outlet 31 is disconnected from the module's inlet 11. For instance, valve 331,332 forms part of the above at least one pair 33, such as forming the urging element 331 and optional spring 332 as mentioned above.

Tank 30 can have a bottom 34 and one or more peripheral upright sidewalls 37 delimiting a liquid storage cavity 38.

Tank 30 may have an opening 36' delimited by a rim 361' for filling a storage cavity 38 of the tank with liquid, such as water.

Tank 30 can have a foot 39 on which tank 30 can rest when filled with liquid before and/or upon assembly of tank 30 to module 10.

Tank 30 may include a passage 39, e.g. a notch or through-opening, for passing an electric cord 18 to module 10, such as an opening in a foot 39' of tank 30.

The invention claimed is:

1. A beverage machine comprising:
   a beverage processing module having a liquid inlet and a module fastening arrangement;
   a liquid supply tank having a liquid outlet and a tank fastening arrangement; the liquid outlet being fluidically connectable to the liquid inlet and disconnectable therefrom;
   a female connector and a male connector arranged to cooperate together for reversibly assembling the beverage processing module and the liquid supply tank, wherein the beverage machine has a configuration selected from the group consisting of (i) the module fastening arrangement comprises the female connector, and the tank fastening arrangement comprises the male connector, and (ii) the module fastening arrangement comprises the male connector, and the tank fastening arrangement comprises the female connector; and
   a support surface and a resilient member arranged to cooperate together to thereby urge the male connector into the female connector to fasten the liquid supply tank to the beverage processing module, wherein the beverage machine has another configuration selected from the group consisting of (i) the module fastening arrangement comprises the support surface, and the tank fastening arrangement comprises the resilient member, and (ii) the module fastening arrangement comprises the resilient member, and the tank fastening arrangement comprises the support surface;
   wherein, the beverage machine is configured such that the female and male connectors have degrees of freedom F1, F2 when the liquid supply tank is assembled to the beverage processing module,
   the beverage machine is further configured such that the resilient member cooperating with the support surface urges the liquid supply tank in a direction U, and
   the degrees of freedom F1, F2 are generally opposite to the direction U.

2. The beverage machine of claim 1, wherein the support surface and the resilient member are configured to be urged together when the liquid supply tank is assembled to the beverage processing module.

3. The beverage machine of claim 2, wherein the support surface forms an outer face of the liquid supply tank, and the resilient member forms a support arm or panel, the support arm or panel projecting from a main body of the beverage processing module and extending across the liquid supply tank at the outer face.

4. The beverage machine of claim 1, wherein the support surface and the resilient member are configured to urge apart at the support surface and the resilient member, wherein the support surface forms an outer face of the liquid supply tank, and wherein the resilient member forms an outer face of the beverage processing module that faces the outer face of the liquid supply tank.

5. The beverage machine of claim 4, wherein the resilient member comprises an urging element, movably mounted at one of the outer faces and wherein the support surface is fixedly or integrally or movably mounted at the other of the outer faces.

6. The beverage machine of claim 4, wherein the resilient member is movably mounted to or in the liquid outlet, and the support surface is fixedly or integrally or movably mounted in or to the liquid inlet; or wherein the resilient member is movably mounted to or in the liquid inlet, and the support surface is fixedly or integrally or movably mounted in or to the liquid outlet.

7. The beverage machine of claim 1, wherein the resilient member and the support surface are formed as or within a male-female mechanical connection arrangement between the beverage processing module and the liquid supply tank.

8. The beverage machine of claim 1, wherein the female connector is formed as a recessed part, and the male connector is formed as a protruding part having a shape generally complementary to the recessed part.

9. The beverage machine of claim 1, wherein the female connector and the male connector are formed as a hook part and a catch part.

10. The beverage machine of claim 1, which comprises a lid at an opening of the liquid supply tank and movable between a position covering the opening and a position uncovering the opening.

11. The beverage machine of claim 10, wherein the lid is permanently or temporarily assembled to the liquid supply tank, and the lid comprises one of the female connector and the male connector for cooperating with the other of the female connector and the male connector comprised by the beverage processing module to fasten the liquid supply tank with the lid to the beverage processing module.

12. The beverage machine of claim 1, wherein the liquid supply tank comprises an upright wall defining a liquid storage cavity, an outside face of the upright wall forming or being fixed to one of the female connector and the male connector for cooperating with the other of the female connector and the male connector.

13. The beverage machine of claim 1, wherein the female connector and the male connector are located at one end of the liquid supply tank, and the support surface and the resilient member are located at a generally opposite end of the liquid supply tank when the liquid supply tank is assembled to the beverage processing module.

14. The beverage machine of claim 1, wherein the female connector and the male connector are located at one face of the liquid supply tank, and the support surface and the resilient member are located at an another face of the liquid supply tank when the liquid supply tank is assembled to the beverage processing module.

15. The beverage machine of claim 1, wherein the beverage processing module comprises a beverage outlet to which the liquid inlet is fluidically connected.

16. The beverage machine of claim 1, wherein:
the beverage processing module comprises a beverage outlet to which the liquid inlet is fluidically connected;
the beverage processing module further comprising at least one element selected from the group consisting of:
a platform for supporting the liquid supply tank;
an ingredient inlet for supplying an ingredient;
a support for placing a user-recipient, for collecting the beverage delivered by the liquid outlet;
an actuator, for actuating the beverage processing module for receiving in and/or evacuating from the beverage processing module an ingredient;
a pump for pumping the liquid from the liquid outlet to the beverage outlet;
a mixing chamber in fluid connection with the liquid inlet and the beverage outlet for mixing the liquid with the ingredient;
a thermal conditioner configured to thermally condition the liquid supplied from the liquid inlet to the beverage outlet;
a machine control unit; and
a waste collector,
and the liquid supply tank comprising at least element selected from the group consisting of:
a valve for allowing a passage of liquid via the liquid supply tank's outlet when the liquid supply tank's outlet is connected to the beverage processing module's inlet and for preventing the passage of liquid via the liquid supply tank's outlet when the liquid supply tank's outlet is disconnected from the beverage processing module's inlet;
a bottom and one or more peripheral upright sidewalls defining a liquid storage cavity;
an opening defined by a rim for filling a storage cavity of the liquid supply tank with the liquid;
a foot on which the liquid supply tank can rest when filled with the liquid before and/or upon assembly of the liquid supply tank to the beverage processing module; and
a passage configured to pass an electric cord to the beverage processing module.

17. The beverage machine of claim 1, wherein the support surface comprises a module support surface, and the resilient member comprises a tank resilient member.

18. The beverage machine of claim 1, wherein the support surface comprises a tank support surface, and the resilient member comprises a module resilient member.

19. The beverage machine of claim 10, wherein the lid and the liquid supply tank have a fastening arrangement configured to fasten the lid in the covering position.

* * * * *